C. W. BECK.
TERMINAL FASTENING.
APPLICATION FILED FEB. 21, 1912.

1,049,557.

Patented Jan. 7, 1913.

WITNESSES:
H. B. Bittinger
B. Mac Donald.

INVENTOR
Charles W. Beck
BY
William M. Swan
ATTORNEY

UNITED STATES PATENT OFFICE.

CHARLES W. BECK, OF ROCKVILLE CENTER, NEW YORK, ASSIGNOR TO MICHIGAN MOTOR SPECIALTIES COMPANY, OF DETROIT, MICHIGAN, A CORPORATION OF MICHIGAN.

TERMINAL FASTENING.

1,049,557.  Specification of Letters Patent.  Patented Jan. 7, 1913.

Application filed February 21, 1912. Serial No. 679,004.

*To all whom it may concern:*

Be it known that I, CHARLES W. BECK, who am a citizen of the United States, residing at Rockville Center, in the county of Nassau and State of New York, have invented certain new and useful Improvements in Terminal Fastenings, of which the following is a specification.

This invention relates to electric terminal fastenings, and has for its object an improved device adapted not only for quick and easy attachment to and detachment from the stem of a spark plug or binding post, but also the easy and firm insertion of the stem portion of the external engaging piece in the end of the wire-carrying cable.

Figure 1:
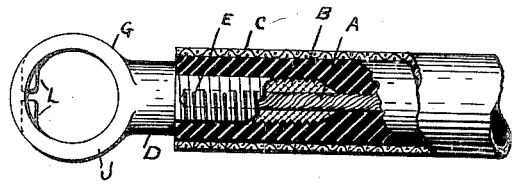
Figure 2:
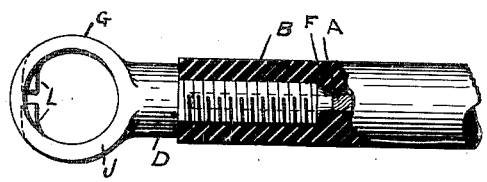
Figure 3:
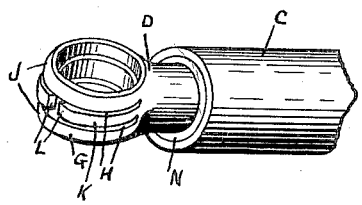
Figure 4:
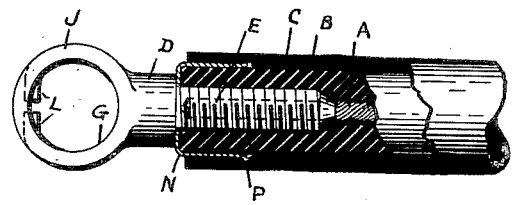
Figure 5:
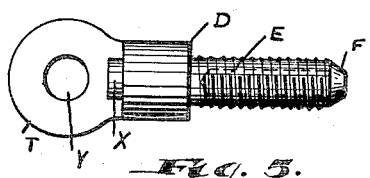
Figure 6:
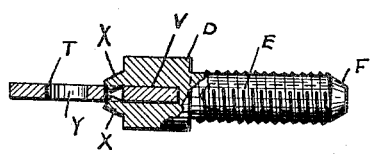

In the drawings:—Figure 1 is an elevation, largely sectional, of a clip and its adjacent cable end, showing the relative position of all the parts. Fig. 2 is similar to Fig. 1 except for the fact that there is no fiber layer or covering over the rubber portion of the cable. Fig. 3 is a perspective of a clip and cable connection of slightly modified form. Fig. 4 is an elevation, largely sectional, showing the structural details of this modified form. Fig. 5 is an elevational view of a modified form of stem-engaging clip. Fig. 6 is an elevation of the device of Fig. 5 from a position at right angles to that of Fig. 5.

A represents the wire of a cable, which is insulated by the rubber covering B, which may if desired be in turn further covered by the fiber or hard rubber covering C. Into the rubber B at the end of the cable is forced the threaded end of the clip member D, whose outer portion is adapted to engage about the stem of a spark plug or a binding post. The center of this inner end of the clip is hollowed out, as at E, for the engagement therewithin, in order to secure contact with the metal fastenings of the end of the wire A, about which, until the end of the clip was forced thereabout, the rubber covering B closely engaged. The entering end F of the fastening is preferably beveled or sharpened.

The type of clip illustrated in Figs. 1, 2, 3, and 4, has its outer end in the form of a loop G, which is partially split by the kerfs H leaving one or more complete rings J, and at least one divided portion K, whose points L may be slightly inbent, so as to resiliently engage about a spark plug stem over which the broken rings J engage freely, thus furnishing a resistance to its displacement from position on the stem unless it be intended to remove it by a positive and sufficiently firm pull.

In the type of clip illustrated in Figs. 3 and 4 there is inserted in the hard rubber covering or sleeve on the cable end, so that its perforated center portion lies almost flush with the end of the cable, a cap N whose slightly flanged edge P extends sufficiently into the inner face of the covering C to be held firmly in place. It is obvious that this type is principally adapted for use with a cable designed especially for rather hard usage; its office is to insure solidity and firmness of the assembled clip and cable parts.

In the modified form illustrated in Figs. 5 and 6 there is substituted for the kerfed annular head of the fastening a stamped metal piece T, which is adapted to engage in the longitudinal kerf V in the body of the clip. This is so cut as to engage with sufficient resiliency over the stem of the spark plug or binding post with its cut away center portion Y. It is held in place by the tongues X, which rise from the outer end of the body of the clip, and are bent over the inserted inner end of the sheet metal stem-engaging portion after that has been forced into place.

What I claim is:—

1. In an electric terminal fastening, in combination with an insulated cable end, a centrally hollowed end member adapted to carry a stem-engaging clip, and engaging about the wire and within the insulation thereof, substantially as described.

2. An electric terminal fastening, having, in combination with an insulated cable end, a body portion having a beveled inner end, adapted to engage about the wire portion of the cable and within the insulating material, the outer end of said body portion being adapted to support a stem-engaging clip, substantially as described.

3. An electric terminal fastening, comprising an externally threaded and centrally hollowed member adapted to engage within the insulating portion of a cable end and about the wire thereof, the outer end being adapted to removably engage over the stem of a spark plug, substantially as described.

4. An electric terminal fastening, comprising a body portion having a longitudinally extending aperture into which the end of a current-carrying wire may engage, and adapted to support at its end opposite that entered by the wire a stem-engaging member, substantially as described.

5. In an electric terminal fastening, in combination with a centrally bored stem portion adapted to engage about the end of a current-carrying wire and within the insulating material of the cable of which said wire is a part, an apertured cap member through which said stem portion engages, adapted to engage over and about the end of the cable, substantially as described.

In testimony whereof I affix my signature in presence of two witnesses.

CHARLES W. BECK.

Witnesses:
WILLIAM M. SWAN,
SARAH J. ANTAYA.